United States Patent
Krenz

(10) Patent No.: US 11,840,356 B2
(45) Date of Patent: Dec. 12, 2023

(54) INDICATORS FOR HYBRID ELECTRICAL POWERPLANTS

(71) Applicant: PRATT & WHITNEY CANADA CORP., Longueuil (CA)

(72) Inventor: Michael Krenz, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 956 days.

(21) Appl. No.: 16/709,487

(22) Filed: Dec. 10, 2019

(65) Prior Publication Data

US 2020/0277081 A1    Sep. 3, 2020

Related U.S. Application Data

(60) Provisional application No. 62/812,671, filed on Mar. 1, 2019.

(51) Int. Cl.
*B64D 45/00*   (2006.01)
*B64D 43/00*   (2006.01)
*B64D 27/02*   (2006.01)

(52) U.S. Cl.
CPC ............ *B64D 45/00* (2013.01); *B64D 27/02* (2013.01); *B64D 43/00* (2013.01); *B64D 2027/026* (2013.01); *B64D 2045/0085* (2013.01)

(58) Field of Classification Search
CPC ........ B64D 45/00; B64D 27/02; B64D 43/00; B64D 2027/026; B64D 2045/0085; G01C 23/00
USPC .......................................................... 701/99
See application file for complete search history.

(56) References Cited

U.S. PATENT DOCUMENTS

| | | | |
|---|---|---|---|
| 7,023,216 B2 | 4/2006 | Prema et al. |
| 7,513,119 B2 | 4/2009 | Zielinski et al. |
| 7,772,791 B2 | 8/2010 | Lim et al. |
| 8,155,801 B2 | 4/2012 | Chang et al. |
| 8,423,214 B2 | 4/2013 | Kshatriya |
| 8,610,382 B2 | 12/2013 | Goldammer et al. |
| 8,727,271 B2 | 5/2014 | Salyer |
| 8,831,816 B2 | 9/2014 | Kwon et al. |
| 8,831,864 B1 | 9/2014 | Chen et al. |
| 8,868,278 B2 | 10/2014 | Amano |
| 8,931,732 B2 | 1/2015 | Sirohi et al. |

(Continued)

FOREIGN PATENT DOCUMENTS

| | | |
|---|---|---|
| EP | 2889221 A1 | 7/2015 |
| EP | 3434592 A1 | 1/2019 |

(Continued)

OTHER PUBLICATIONS

Extended European Search Report for European Patent Application No. EP19918456.5, dated Oct. 17, 2022.

(Continued)

*Primary Examiner* — Muhammad Shafi
(74) *Attorney, Agent, or Firm* — Locke Lord LLP; Daniel J. Fiorello; Gabrielle L. Gelozin

(57) ABSTRACT

An indicator for a hybrid electric powerplant for an aircraft can be configured to indicate at least an amount or percentage of a total power and/or total torque, and an amount or percentage of an electric motor power and/or electric motor torque. For example, the indicator can be a graphical user interface (GUI) of an aircraft cockpit display.

18 Claims, 6 Drawing Sheets

(56) References Cited

U.S. PATENT DOCUMENTS

| | | | |
|---|---|---|---|
| 8,958,936 B2 | 2/2015 | Treharne et al. | |
| 9,045,223 B2 | 6/2015 | Connaulte et al. | |
| 9,174,741 B2 | 11/2015 | Suntharalingam et al. | |
| 9,181,866 B2 | 11/2015 | Jensen et al. | |
| 9,370,992 B2 | 6/2016 | Holmes et al. | |
| 9,561,860 B2 | 2/2017 | Knapp et al. | |
| 9,714,025 B2 | 7/2017 | Yang et al. | |
| 9,789,768 B1 | 10/2017 | Meier | |
| 9,937,803 B2 | 4/2018 | Siegel et al. | |
| 10,000,202 B2 | 6/2018 | Park et al. | |
| 10,006,375 B1 | 6/2018 | Wagner et al. | |
| 10,040,566 B2 | 8/2018 | Waltner | |
| 10,124,886 B2 | 11/2018 | Perkins et al. | |
| 10,131,442 B2 | 11/2018 | Waltner et al. | |
| 10,137,981 B2 | 11/2018 | Miller et al. | |
| 10,173,787 B1* | 1/2019 | Oltheten | B64D 45/00 |
| 10,183,664 B2 | 1/2019 | Yang et al. | |
| 10,207,698 B2 | 2/2019 | Kim et al. | |
| 10,273,019 B2 | 4/2019 | Sands et al. | |
| 10,351,253 B2 | 7/2019 | Dong et al. | |
| 10,382,225 B2 | 8/2019 | Dormiani et al. | |
| 2010/0108806 A1* | 5/2010 | Chan | F02C 6/18 244/1 N |
| 2011/0168835 A1 | 7/2011 | Oliver | |
| 2011/0198439 A1 | 8/2011 | Rotger et al. | |
| 2012/0119020 A1 | 5/2012 | Burns et al. | |
| 2012/0153076 A1 | 6/2012 | Burns et al. | |
| 2013/0087654 A1 | 4/2013 | Seibt | |
| 2014/0117148 A1* | 5/2014 | Dyrla | B64D 35/08 244/17.13 |
| 2014/0138479 A1 | 5/2014 | Vieillard et al. | |
| 2014/0158816 A1 | 6/2014 | DeLorean | |
| 2015/0042155 A1 | 2/2015 | Vieillard et al. | |
| 2015/0353189 A1 | 12/2015 | Kharitonov | |
| 2016/0122007 A1 | 5/2016 | Cox et al. | |
| 2016/0207633 A1 | 7/2016 | McWaters et al. | |
| 2018/0002025 A1 | 1/2018 | Lents et al. | |
| 2018/0127104 A1 | 5/2018 | Kobayashi et al. | |
| 2018/0134400 A1 | 5/2018 | Knapp et al. | |
| 2018/0134413 A1 | 5/2018 | Halsey et al. | |
| 2018/0208305 A1 | 7/2018 | Lloyd et al. | |
| 2018/0354615 A1 | 12/2018 | Groninga et al. | |
| 2019/0031333 A1 | 1/2019 | Groninga et al. | |

FOREIGN PATENT DOCUMENTS

| | | | |
|---|---|---|---|
| JP | 2007-314100 | * | 12/2007 |
| JP | 2007-314100 | A | 12/2007 |
| JP | 2011006041 | A | 1/2011 |
| JP | 2017121925 | A | 7/2017 |
| KR | 101682670 | B1 | 12/2016 |
| WO | 2008/125077 | | 10/2008 |
| WO | 2011037852 | | 3/2011 |
| WO | 2014/137365 | | 9/2014 |
| WO | 2015146608 | | 10/2015 |

OTHER PUBLICATIONS

International Search report and Written Opinion issued in corresponding PCT Application No. PCT/US2019/065476, dated Apr. 9, 2020.

* cited by examiner

INDICATORS FOR HYBRID ELECTRICAL POWERPLANTS

CROSS-REFERENCE TO RELATED APPLICATION

This application claims priority to and the benefit of U.S. Provisional Patent Application Ser. No. 62/812,671, filed Mar. 1, 2019, the contents thereof being incorporated herein by reference in their entirety.

BACKGROUND

1. Field

This disclosure relates to aircraft and engine systems therefor, and more particularly to hybrid electric aircraft powerplants and indicators, e.g., such as graphical user interfaces (GUIs) therefor.

2. Description of Related Art

Aircraft engines vary in efficiency and function over a plurality of parameters, such as thrust requirements, air temperature, air speed, altitude, and the like. Aircraft require the most thrust at takeoff, wherein the demand for engine power is the heaviest. However, during the remainder of the mission, the aircraft engines often do not require as much thrust as during takeoff. The size and weight of the engines allows them to produce the power needed for takeoff, however after take-off the engines are in effect over-sized for the relatively low power required to produce thrust for cruising in level flight.

Such conventional methods and systems have generally been considered satisfactory for their intended purpose. However, there is still a need in the art for improved aircraft engine systems and indicators therefor. The present disclosure provides a solution for this need.

SUMMARY

An indicator for a hybrid electric powerplant for an aircraft can be configured to indicate at least an amount or percentage of a total power and/or total torque, and an amount or percentage of an electric motor power and/or electric motor torque. For example, the indicator can be a graphical user interface (GUI) of an aircraft cockpit display.

The indicator can be a torque indicator such that the amount or percentage of the total power and/or total torque is a percentage of total available torque from the powerplant. Also, in certain embodiments, the amount or percentage of the electric motor power and/or electric motor torque can be electric motor torque percentage portion of the percentage of total torque.

The percentage of total available torque can include at least one of a total torque percentage graphical representation or a total torque numerical value. The electric motor torque percentage portion can include at least one of an electric torque graphical representation or an electric torque numerical value.

The percentage of total available torque can include both of a total torque percentage graphical representation and a total torque numerical value. The electric motor torque percentage can include both of an electric torque graphical representation and an electric torque numerical value.

In certain embodiments, the indicator can include a torque range line, a total torque symbol indicating the percentage of total available torque in the torque range line, and an electric torque portion symbol indicating the electric torque percentage portion along the line. The electric torque portion symbol can indicate the electric torque percentage portion between the electric torque percentage portion symbol and the total torque symbol.

In certain embodiments, the torque range line can be a curve and include one or more numerical indices indicating a percentage value at different points of the torque range line. The total torque symbol can be a first arrow pointing to the torque range line and having first characteristics, and the electric torque portion symbol can be a second arrow pointing to the torque range line and having second characteristics.

In certain embodiments, the graphical representation of the electric motor torque can include an indicator ribbon having a heat engine torque percentage section having first characteristics indicating a heat engine percentage portion and an electric torque section having second characteristics indicating the electric torque percentage portion. The ribbon can be defined between a bottom end of the total torque line and the total torque symbol. The electric torque section of the ribbon can be defined between the electric torque portion symbol and the total torque symbol.

In certain embodiments, the indicator can also configured to indicate electric motor temperature and a heat engine temperature adjacent the amount or percentage of a total power and/or total torque and the amount or percentage of an electric motor power and/or electric motor torque. Any other suitable indications are contemplated herein.

In accordance with at least one aspect of this disclosure, an aircraft instrument can include an electronic display and an instrument module connected to the electronic display. The instrument module can be configured to receive at least one of power and/or torque amount and/or percentage from an electric motor system and at least one of a heat engine system or a total torque sensor, and to display a graphical user interface (GUI) on the display. The GUI can be configured to indicate the same as any suitable embodiment of an indicator as disclosed herein.

In accordance with at least one aspect of this disclosure, a method can include receiving a heat engine system torque value or percentage or total torque value or percentage, receiving an electric motor system torque value and/or percentage, and displaying a total torque percentage of total available torque and an electric torque percentage portion of the total torque to indicate a share of power that is being generated by each of the heat engine system and the electric motor system. Displaying the total torque percentage and the electric torque percentage portion can include graphically displaying a percentage representation and numerically displaying a numerical percentage value.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
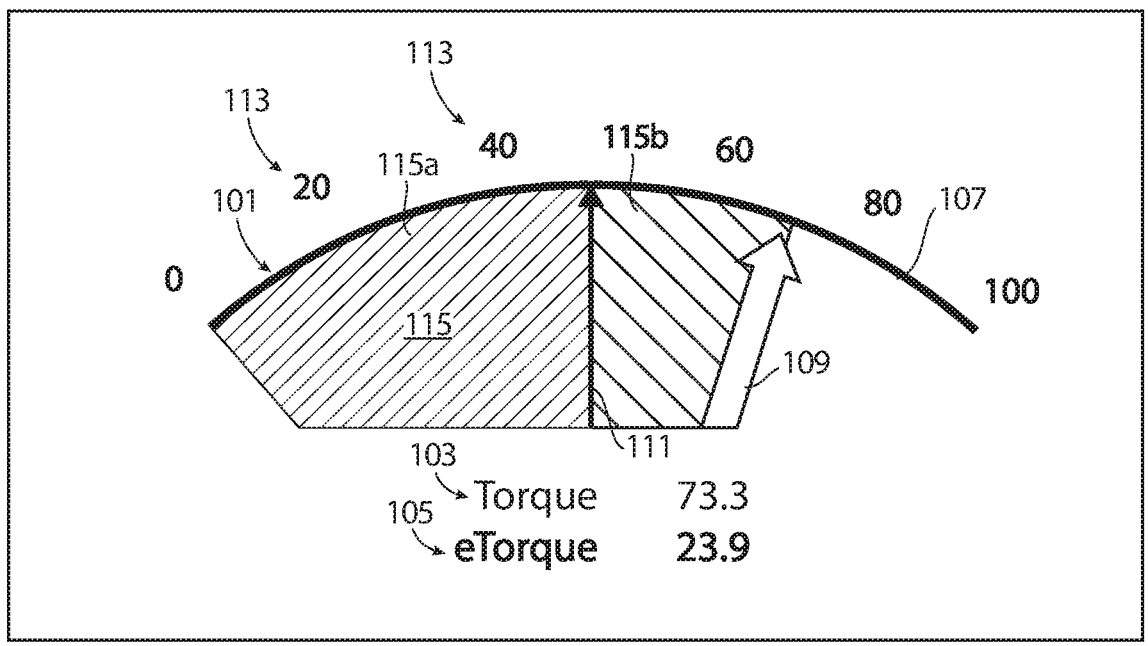
FIG. 1 is a schematic view of an embodiment of an indicator in accordance with this disclosure.

Reference will now be made to the drawings wherein like reference numerals identify similar structural features or aspects of the subject disclosure. For purposes of explanation and illustration, and not limitation, an illustrative view of an embodiment of an indicator in accordance with the disclosure is shown in FIG. 1 and is designated generally by reference character 100. Other embodiments and/or aspects of this disclosure are shown in FIGS. 2A-6.

Referring to FIG. 1, an indicator for a hybrid electric powerplant for an aircraft can be configured to indicate at least an amount or percentage of a total power and/or total torque, and an amount or percentage of an electric motor power and/or electric motor torque. For example, the indicator can be a graphical user interface (GUI) of an aircraft cockpit display. The display can be part of any suitable aircraft device (e.g., an in individual powerplant instrument, an EFD, an MFD, and/or other suitable glass panel device for example). In certain embodiments, the indicator can be an analog indicator, or any suitable combination of an analog and digital indicator.

As shown, the indicator can be a torque indicator such that the amount or percentage of the total power and/or total torque is a percentage of total available torque from the powerplant. Also, in certain embodiments, the amount or percentage of the electric motor power and/or electric motor torque can be electric motor torque percentage portion of the percentage of total torque.

The percentage of total available torque can include at least one of a total torque percentage graphical representation (e.g., integrated in graphical representation 101 or otherwise independent) or a total torque numerical value 103. The electric motor torque percentage portion can include at least one of an electric torque graphical representation (e.g., integrated in graphical representation 101 as shown or otherwise independent) or an electric torque numerical value 105. As shown in FIG. 1, in certain embodiments, the percentage of total available torque can include both of a total torque percentage graphical representation (e.g., integrated in graphical representation 101) and a total torque numerical value 103 (e.g., disposed below the graphical representation as shown). Similarly, the electric motor torque percentage can include both of an electric torque graphical representation (e.g., integrated in the graphical representation 101 as shown) and an electric torque numerical value (e.g., disposed below the graphical representation and/or below the total torque numerical representation 103 as shown).

In certain embodiments, the indicator 100 can include a torque range line 107, a total torque symbol 109 indicating the percentage of total available torque on the torque range line 107, and an electric torque portion symbol 111 indicating the electric torque percentage portion along the line 107. In certain embodiments, the electric torque portion symbol 111 can indicate the electric torque percentage portion between the electric torque percentage portion symbol 111 and the total torque symbol 109 (e.g., by being positioned at the high terminus of the heat engine system torque value as shown).

In certain embodiments, the torque range line 107 can be a curve, e.g., as shown, and include one or more numerical indices 113 indicating a percentage value at different points of the torque range line 107 (e.g., values from 0 to 100, and in increments of 20 as shown). Any other suitable shape for the line 107, and any other suitable index scheme is contemplated herein. It is contemplated that a torque range line 107 need not be included in the indicator 100.

In certain embodiments, the total torque symbol 109 can be a first arrow pointing to the torque range line 107 and having first characteristics (e.g., a first color and/or thickness), and the electric torque portion symbol 111 can be a second arrow pointing to the torque range line 107 and having second characteristics (e.g., a second color and/or thickness different than the first arrow). Any suitable other shape, color scheme, and/or design (e.g., cross-hatching) for either the total torque symbol 109 or the electric torque portion symbol 111 is contemplated herein. In certain embodiments, the symbols 109, 111 can be the same, however, different symbols can allow a pilot to quickly understand and scan the instrument.

In certain embodiments, the graphical representation 101 of the electric motor torque can include an indicator ribbon 115 having a heat engine torque percentage section 115a having first characteristics indicating a heat engine percentage portion (e.g., of total available torque) and an electric torque section 115b having second characteristics indicating the electric torque percentage portion. As appreciated by those having ordinary skill in the art in view of this disclosure, that addition of the heat engine torque percentage portion and the electric torque percentage portion equals the total torque percentage of the total available torque. Also, as appreciated by those having ordinary skill in the art in view of this disclosure, the heat engine torque percentage portion equals the total torque percentage minus the electric torque percentage portion, and vice versa for the electric torque percentage portion.

As shown the ribbon 115 can be defined between a bottom end of the total torque line 107 and the total torque symbol 109. The electric torque section 115*b* of the ribbon 115 can be defined between the electric torque portion 111 symbol and the total torque symbol 109. Any other suitable location for the electric torque section 115 is contemplated herein (e.g., switching places with the heat engine torque section 115*a*).

In certain embodiments, there can be more than two contributing sources of torque. For example, certain systems can include a thermal power, electric power, and fuel cell powered. In such cases, for example, the indicator can include three or more segments on the ribbon to represent each source of a plurality of sources greater than two as appreciated by those having ordinary skill in the art in view of this disclosure.

Figure 2A:
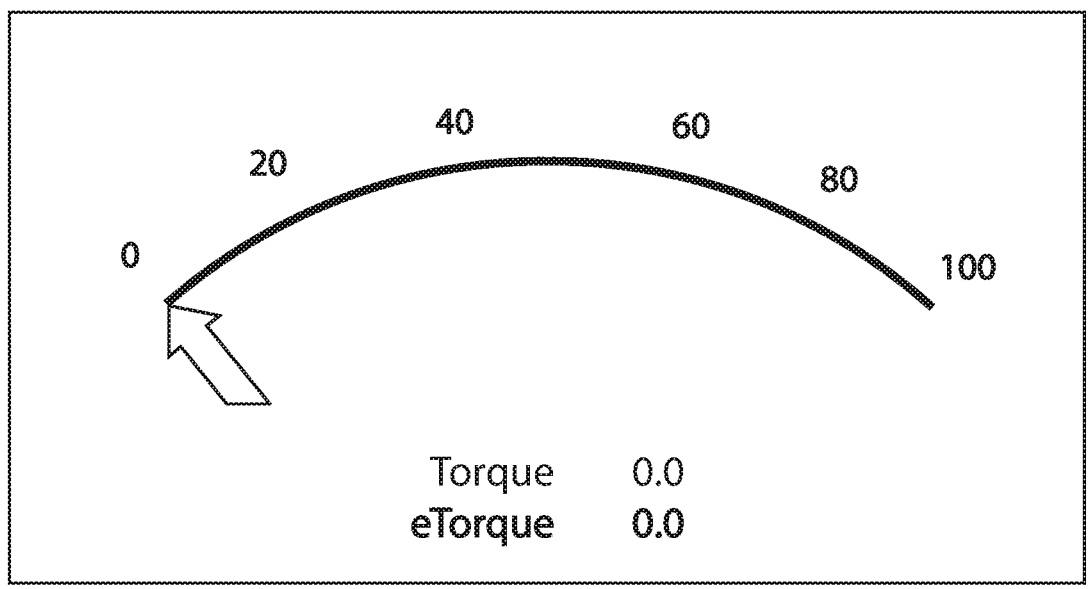
FIG. 2A is a schematic view of the embodiment of FIG. 1, wherein the indicator is indicating no total torque and no electric motor torque either.

FIGS. 2A-2E show various possible states of the indicator (e.g., in different flight and/or power production conditions). For example, FIG. 2A shows that the indicator 100 is indicating no total torque and no electric motor torque either, e.g., such that the powerplant connected to the indicator 100 is off (e.g., total torque is set to 0 on a power lever (PLA)).

Figure 2B:
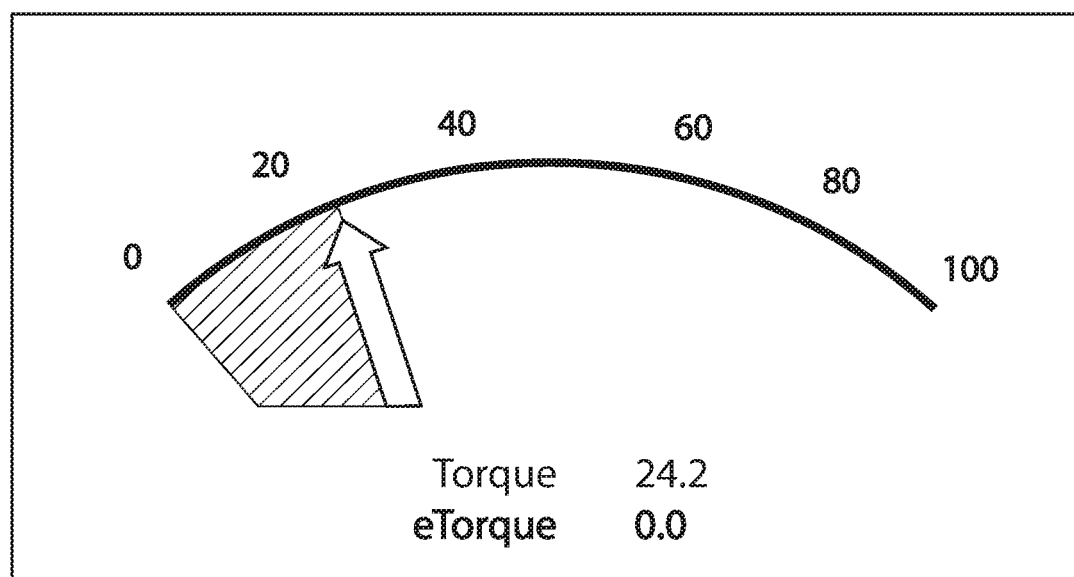
FIG. 2B is a schematic view of the embodiment of FIG. 1, wherein the indicator is indicating that total torque is about one quarter of total available torque and there is no electric motor torque.

FIG. 2B shows that the indicator 100 is indicating that total torque is about one quarter of total available torque and there is no electric motor torque. For example, FIG. 2B may indicate a low power setting such as idle or any other suitable setting such as a PLA that is being advanced up toward takeoff power from 0. In certain torque balancing systems, a torque splitting module may not utilize the electric motor system until more torque is needed than the heat engine system can provide, thereby providing all power from the heat engine system as shown, for example.

Figure 2C:
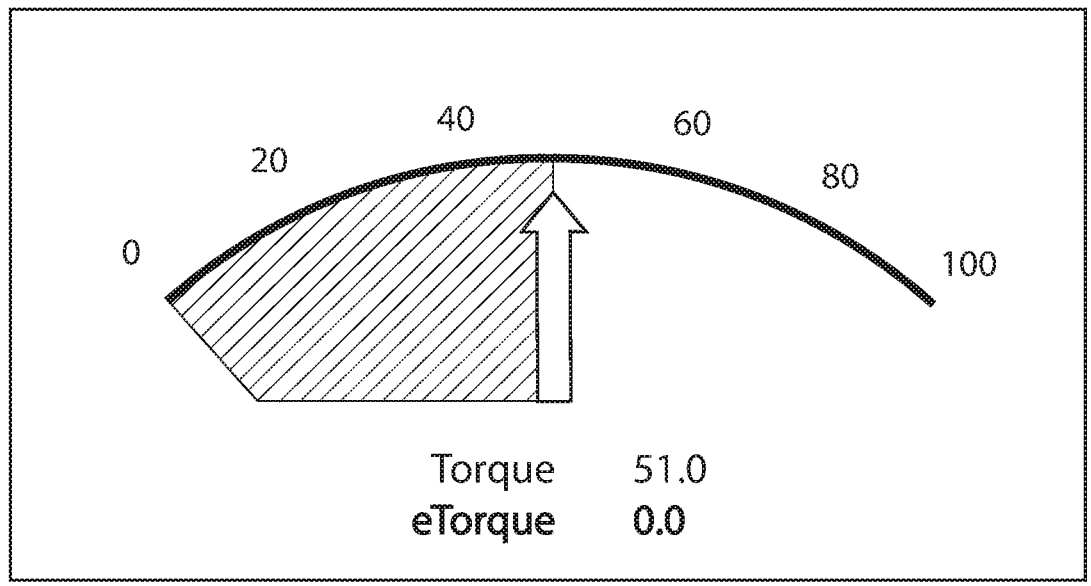
FIG. 2C is a schematic view of the embodiment of FIG. 1, wherein the indicator is indicating that the total torque is about half of the total available torque and there is no electric motor torque.

FIG. 2C shows that the indicator 100 is indicating that the total torque is about half of the total available torque and there is no electric motor torque still, e.g., similar to 2B. This can indicate a cruise setting power where only heat engine torque is needed, or can indicate any other point before heat engine system torque is above a maximum (e.g., when continuing to advance a PLA toward takeoff power from FIG. 2B).

Figure 2D:
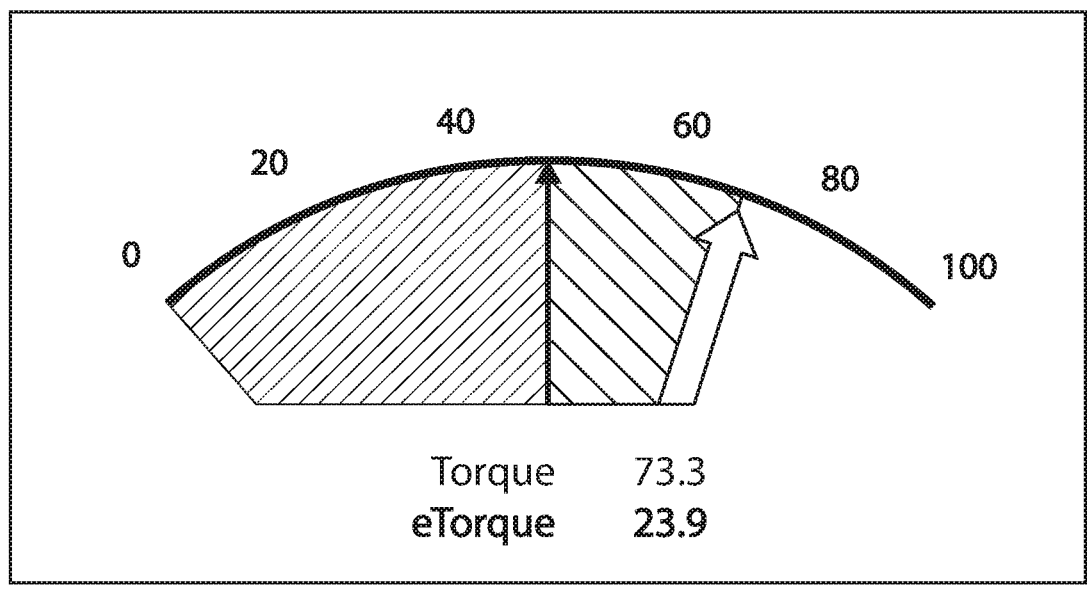
FIG. 2D is a schematic view of the embodiment of FIG. 1, wherein the indicator is indicating that the total torque is about three quarters of the total available torque and the electric motor torque is about one quarter of total available torque as well as about one third of the total torque.

FIG. 2D shows that the indicator 100 is indicating that the total torque is about three quarters of the total available torque and the electric motor torque is about one quarter of total available torque as well as about one third of the total torque. This can indicate a cruise climb setting, for example, or any other setting where more torque than maximum heat engine system torque can provide, but less than full power is required (e.g., fast cruise). This can also indicate continued advancement of the PLA toward takeoff power from FIG. 2C).

Figure 2E:
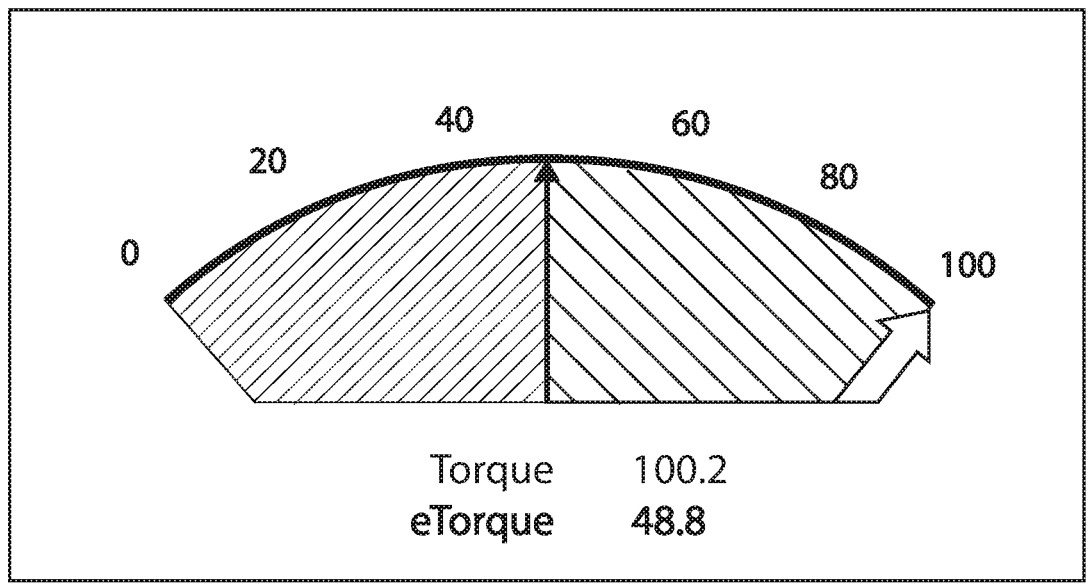
FIG. 2E is a schematic view of the embodiment of FIG. 1, wherein the indicator is indicating that the total torque is about maximum of the total available torque and the electric motor torque is about half of total available torque as well as about one half of the total torque.

FIG. 2E shows that the indicator 100 is indicating that the total torque is about maximum of the total available torque and the electric motor torque is about half of total available torque as well as about one half of the total torque. This can indicate full power operation for takeoff power and/or max climb power (e.g., in systems where the electric motor system provides about the same torque as the heat engine system). In certain embodiments, any suitable portion of the indicator 100 (e.g., the numerical readouts and/or arrows) can change color (e.g., to red) to indicate out of range or failure conditions. For example, as shown, a numerical percentage value can change to red when over 100. In certain embodiments, the symbols (e.g., arrows) and/or one or more of the ribbon sections can also change color in a value limit (e.g., high or low) or failure scenario, for example. In certain embodiments, where a torque sensor has failed, the color change can be to yellow dashes for the numerical readout and removal of the ribbon section and/or pointer from the analog display. Any other suitable color or shape changes are contemplated herein.

Figure 3:
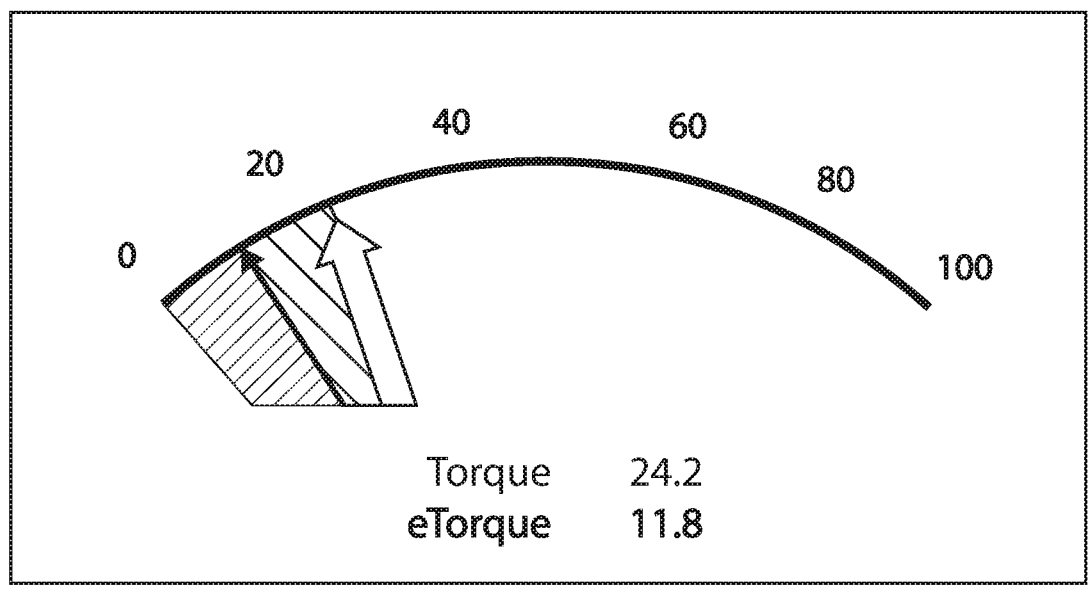
FIG. 3 is a schematic view of the embodiment of FIG. 1, wherein the indicator is indicating that the total torque is about a quarter of the total available torque and the electric motor torque is about one eighth of the total available torque, or one half of the total torque.

FIG. 3 illustrates where the indicator 100 is indicating that the total torque is about a quarter of the total available torque and the electric motor torque is about one eighth of the total available torque, or one half of the total torque. This can indicate that the torque balancing system is defective, or that the powerplant system applies a different torque balancing scheme than that shown in FIGS. 2A-2E, for example. In certain systems, this can also indicate that the heat engine is unable to produce torque above about one eighth of total available torque.

Figure 4:
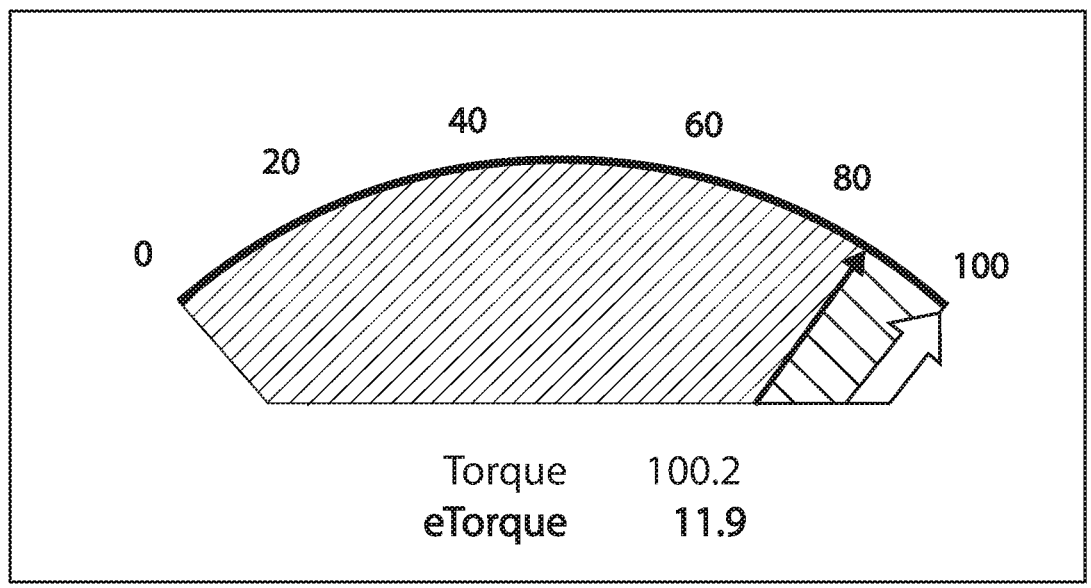
FIG. 4 is a schematic view of the embodiment of FIG. 1, wherein the indicator is indicating that the total torque is about maximum of the total available torque and the electric motor torque is about one eighth of total available torque as well as about one eighth of the total torque.

FIG. 4 shows that the indicator 100 is indicating that the total torque is about maximum of the total available torque and the electric motor torque is about one eighth of total available torque as well as about one eighth of the total torque. This indicates a different power distribution than the systems connected to the indicator 100 in FIGS. 2A-2E (e.g., where the heat engine produces about 90% of the total torque of the powerplant and the electric motor produces around 10%). In systems where this is not this case, such an indication can mean the indicator 100 has a faulty readout, for example.

Figure 5:
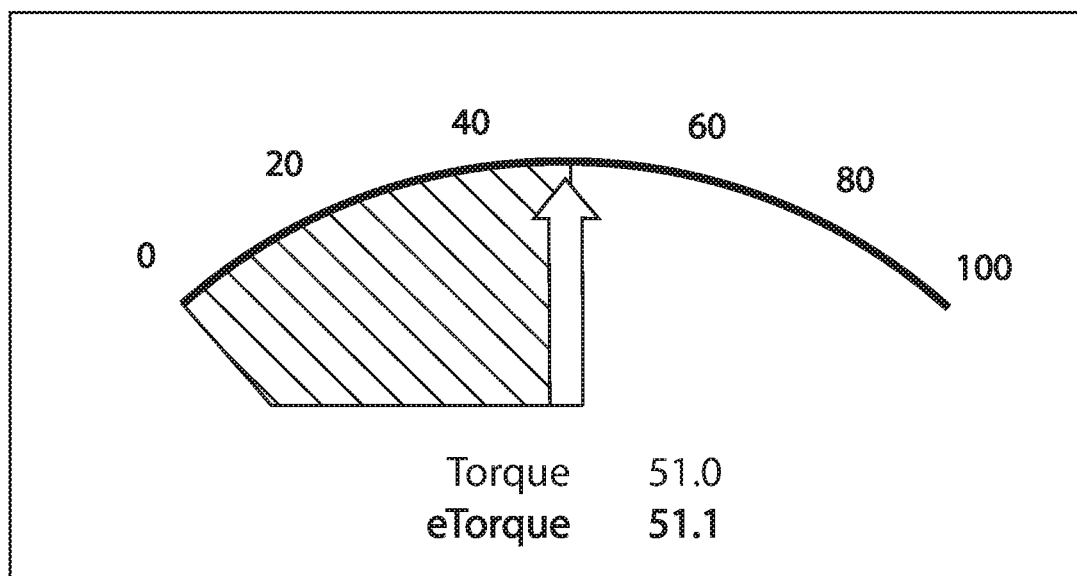
FIG. 5 is a schematic view of the embodiment of FIG. 1, wherein the indicator is indicating that the total torque is about one half of the total available torque, that electric motor torque is about half of the total available torque as well as about all of the total torque.

FIG. 5 shows that the indicator 100 is indicating that the total torque is about one half of the total available torque, that electric motor torque is about half of the total available torque as well as about all of the total torque. For example, this can indicate a heat engine failure scenario where there is a total loss of power from the heat engine system and the electric motor system is supplying all torque. While several indications and interpretations thereof are disclosed above, any suitable indication and/or interpretation thereof is contemplated herein, and can be application dependent.

Figure 6:
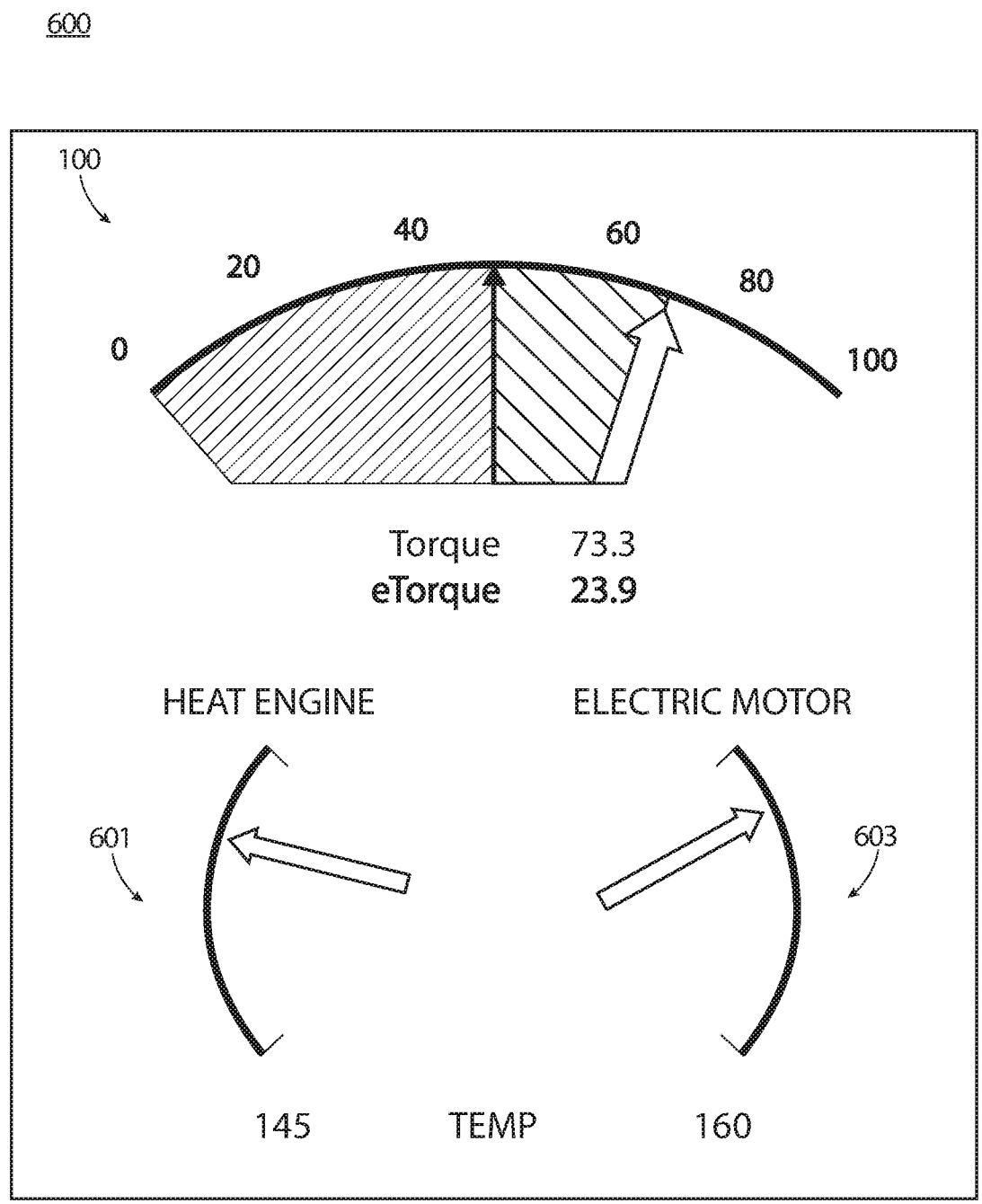
FIG. 6 is a schematic view of an embodiment of an indicator in accordance with this disclosure, showing the embodiment of FIG. 1 also including or more additional indicators.

Referring to FIG. 6, in certain embodiments, an indicator 600, e.g., including indicator 100 disclosed above, can also be configured to indicate electric motor temperature and a heat engine temperature adjacent the amount or percentage of a total power and/or total torque and the amount or percentage of an electric motor power and/or electric motor torque. For example, the indicator 600 can include a heat engine temperature indicator 601 (e.g., a dial and/or any other suitable indicator) and an electric motor temperature indicator (e.g., a dial and/or any other suitable indicator). This can aid the pilot in assessing powerplant system health for a hybrid electric powerplant system. Any other suitable indications are contemplated herein (e.g., battery state of charge, a rate of discharge or charge, etc.)

In accordance with at least one aspect of this disclosure, an aircraft instrument can include an electronic display and an instrument module connected to the electronic display. The instrument module can be configured to receive at least one of power and/or torque amount and/or percentage from an electric motor system and at least one of a heat engine system or a total torque sensor, and to display a graphical user interface (GUI) on the display. The GUI can be configured to indicate the same as any suitable embodiment of an indicator as disclosed herein (e.g., described above). The instrument can include any suitable indicator as disclosed herein (e.g., as described above), and is not limited to GUIs. Embodiments of an instrument can include any suitable hardware and/or software modules as appreciated by those having ordinary skill in the art configured to perform any suitable function (e.g., disclosed herein). For example, the instrument can include any suitable memory to store computer code configured to generate a GUI as disclosed herein on an electronic display, and any suitable processor to cause display of the GUI.

Embodiments of an instrument can receive total torque from a torque sensor (e.g., on an output shaft) and receive an estimated or actual torque value from the control system that balances the torque and/or controls the electric motor (e.g., a torque splitting module, an electric motor control module). In certain embodiments, the instrument can receive the total torque and the electric torque. The instrument can subtract the electric torque from the total torque to get the thermal torque instead of adding two sources to get the total torque. In certain embodiments, the torque can be sensed on both power lanes. Embodiments of an instrument can be configured to be a drop in replacement for an existing instrument, and/or can be integrate in any suitable manner into an existing instrument (e.g., by modifying the software and/or hardware to receive suitable inputs and output at least total torque and electric motor torque indications). The instrument can include any suitable modules to receive any suitable inputs (e.g., total torque values from one or more total torque sensors and electric torque values from an ECU or one or more torque sensors) and to process the inputs (e.g., subtracting electric torque from total torque to produce a thermal torque value) to allow indication of electric torque, thermal torque, total torque, and/or any other suitable indication.

In accordance with at least one aspect of this disclosure, a method can include receiving a heat engine system torque value or percentage or total torque value or percentage, receiving an electric motor system torque value and/or percentage, and displaying a total torque percentage of total available torque and an electric torque percentage portion of the total torque to indicate a share of power that is being generated by each of the heat engine system and the electric motor system. Displaying the total torque percentage and the electric torque percentage portion can include graphically displaying a percentage representation and numerically displaying a numerical percentage value.

Embodiments include an additive torque display and can show total torque and portion of total torque that is electric power. In applications where a FADEC or other control system (e.g., having a torque splitting module) do the balancing and this is just a display, the pilot may not have any manual control over the distribution of electric power vs heat power (e.g., other than to reduce total power in certain systems to reduce electric power contribution and reduce battery discharge). In certain applications, the pilot may have separate manual control to modify the distribution manually, and thus control the electric motor system and/or the heat engine system as a function of what is indicated by the indicator 100, for example. Embodiments enable safe and efficient operation of a hybrid electric powerplant for an aircraft, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An indicator for a hybrid electric powerplant for an aircraft configured to indicate at least:
    an amount or percentage of a total power and/or total torque; and
    an amount or percentage of an electric motor power and/or electric motor torque,
    wherein the indicator is a torque indicator, wherein the amount or percentage of the total power and/or total torque is a percentage of total available torque from the powerplant.

2. The indicator of claim 1, wherein the indicator is a graphical user interface (GUI) of an aircraft cockpit display.

3. The indicator of claim 1, wherein the amount or percentage of the electric motor power and/or electric motor torque is electric motor torque percentage portion of the percentage of total torque.

4. The indicator of claim 3, wherein the percentage of total available torque includes at least one of a total torque percentage graphical representation or a total torque numerical value.

5. The indicator of claim 4, wherein the electric motor torque percentage portion includes at least one of an electric torque graphical representation or an electric torque numerical value.

6. The indicator of claim 5, wherein the percentage of total available torque includes both of a total torque percentage graphical representation and a total torque numerical value.

7. The indicator of claim 6, wherein the electric motor torque percentage includes both of an electric torque graphical representation and an electric torque numerical value.

8. The indicator of claim 5, wherein the indicator includes:
    a torque range line;
    a total torque symbol indicating the percentage of total available torque in the torque range line;
    and an electric torque portion symbol indicating the electric torque percentage portion along the line.

9. The indicator of claim 8, wherein the electric torque portion symbol indicates the electric torque percentage portion between the electric torque percentage portion symbol and the total torque symbol.

10. The indicator of claim 8, wherein the torque range line is a curve and includes one or more numerical indices indicating a percentage value at different points of the torque range line.

11. The indicator of claim 8, wherein the total torque symbol is a first arrow pointing to the torque range line and having first characteristics, and wherein the electric torque portion symbol is a second arrow pointing to the torque range line and having second characteristics.

12. The indicator of claim 8, wherein the graphical representation of the electric motor torque includes an indicator ribbon having a heat engine torque percentage section having first characteristics indicating a heat engine percentage portion and an electric torque section having second characteristics indicating the electric torque percentage portion.

13. The indicator of claim 12, wherein the ribbon is defined between a bottom end of the total torque line and the total torque symbol.

14. The indicator of claim 13, wherein the electric torque section of the ribbon is defined between the electric torque portion symbol and the total torque symbol.

15. The indicator of claim 1, wherein the indicator is also configured to indicate electric motor temperature and a heat engine temperature adjacent the amount or percentage of a total power and/or total torque and the amount or percentage of an electric motor power and/or electric motor torque.

16. An indicator for a hybrid electric powerplant for an aircraft configured to indicate at least:
    an amount or percentage of a total power and/or total torque; and
    an amount or percentage of an electric motor power and/or electric motor torque to indicate a share of power that is being generated by each of a heat engine system and an electric motor system of the hybrid electric powerplant.

17. An indicator for a hybrid electric powerplant for an aircraft configured to indicate at least:
    an amount or percentage of a total power and/or total torque; and
    an amount or percentage of an electric motor power and/or electric motor torque, wherein the indicator includes:
    a torque range line;

a total torque symbol indicating the percentage of total available torque in the torque range line;

and an electric torque portion symbol indicating the electric torque percentage portion along the line.

18. The indicator of claim 17, wherein the electric torque portion symbol indicates the electric torque percentage portion between the electric torque percentage portion symbol and the total torque symbol, and wherein a percentage portion between the electric torque symbol and the total torque symbol indicates a heat engine torque percentage such that the total torque percentage minus the electric torque percentage portion equals a heat engine torque percentage portion.

* * * * *